Dec. 27, 1966  J. C. BLAINE  3,294,506
METHOD AND APPARATUS FOR CONSOLIDATING BATCH
Filed June 19, 1962  2 Sheets-Sheet 1

INVENTOR.
John C. Blaine
BY
Nobbe & Swope
ATTORNEYS

Dec. 27, 1966 J. C. BLAINE 3,294,506
METHOD AND APPARATUS FOR CONSOLIDATING BATCH
Filed June 19, 1962 2 Sheets-Sheet 2

INVENTOR.
John C. Blaine
BY
Nobbe & Swope
ATTORNEYS

United States Patent Office 3,294,506
Patented Dec. 27, 1966

3,294,506
METHOD AND APPARATUS FOR CONSOLIDATING BATCH
John C. Blaine, Ottawa, Ill., assignor to Libbey-Owens-Ford Glass Company, Toledo, Ohio, a corporation of Ohio
Filed June 19, 1962, Ser. No. 203,512
5 Claims. (Cl. 65—27)

This invention relates broadly to the art of glass making and more particularly is concerned with a novel method and apparatus for maintaining batch materials supplied to a glass-melting tank-furnace within a desired predetermined path of movement.

According to one known manner of supplying batch materials to a glass-melting tank-furnace, scrap glass or cullet is discharged at the "doghouse" or charging end of the furnace at a substantially continuous rate onto the upper surface of a molten glass pool confined by the walls of the doghouse. A mixture of raw pulverulent batch materials is then deposited on the stratum of cullet glass moving forwardly on or adjacent the surface of the molten glass pool into the actual melting zone of the furnace. The raw batch materials are supplied from a continuously rotating, compartmented roll or vaned cylinder having a length somewhat less than the width of the doghouse and thus form a blanket-like layer on the cullet glass and molten glass pool that extends nearly from one side wall of the doghouse to the opposite side wall.

Now, as the batch materials move forwardly, the marginal edge portions of the layer of raw pulverulent material tend to spread or slide laterally toward the doghouse side walls and build up accumulations thereon. This has been found to be objectionable not only because of the gradual loss of such raw materials from the total quantity of batch moving toward the furnace melting zone, but additionally because such accumulations continually increase and build up inwardly from the walls disrupting the desired feeding pattern and predetermined flow or path of the batch and cullet. As herein contemplated, and by the employment of the method and apparatus of this invention, the overall desired width of the blanket-like layer of raw batch materials is continuously maintained and accumulations thereof on the doghouse side walls prevented by periodically engaging the spreading batch portions and compacting or consolidating the same into the body of the batch layer.

A principal object of the invention is, therefore, the provision of a novel method for maintaining glass batch materials delivered to the doghouse of a glass-melting tank-furnace within a desired, predetermined path of movement.

Another object of the invention is to provide a novel apparatus for preventing loss of batch material and accumulations thereof along the side walls of the doghouse of a tank-furnace by operating to consolidate a forwardly moving layer of batch materials within a predetermined width or path of movement.

More specifically, a further object of the invention is to provide an apparatus of the above character including laterally movable pusher blades and automatically operable means for causing such pusher blades to periodically move relative to the edges of a layer of batch materials and in intermittently timed relation to the movement of said batch materials from the point of their discharge into the doghouse of a tank-furnace.

Other objects and advantages of the invention will become more apparent during the course of the following description when taken in connection with the accompanying drawings.

In the drawings, wherein like numerals are employed to designate like parts throughout the same:

Figure 1:
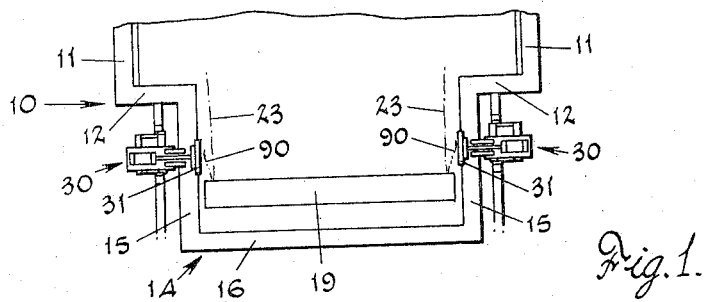
FIG. 1 is a diagrammatic plan view of the batch charging end of a continuous glass-melting tank-furnace, showing the batch consolidating apparatus as constructed in accordance with the present invention.
Figure 2:
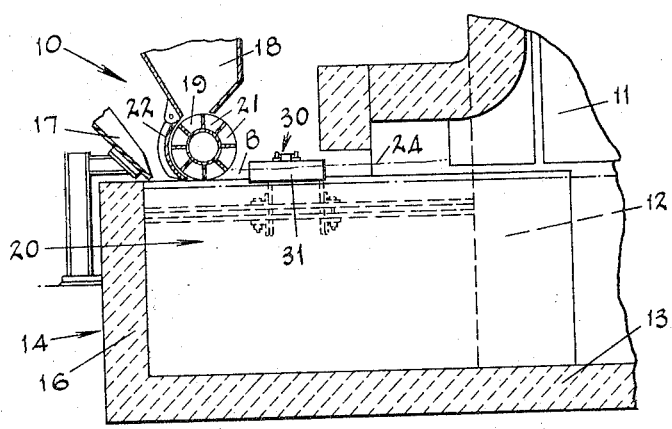
FIG. 2 is a longitudinal, vertical sectional view of the charging end of the furnace.

Referring now particularly to FIGS. 1 and 2 of the drawings, there is shown a conventional continuous glass-melting tank-furnace, generally designated by the numeral 10, and including side walls 11, an end wall 12 and floor 13. A cullet and batch charging area or doghouse 14 opens outwardly from the end wall 12 and is defined by side walls 15, an end wall 16 and the furnace floor 13.

The supply sources of glass batch material are indicated in FIG. 2 as a cullet glass discharge pan 17, a hopper 18 in which the raw pulverulent batch mixture is contained, and a compartmented roll 19 arranged at the open lower end of the hopper. Since the pan 17 and roll 19 incorporate the structural features of one well known manner of supplying batch materials, it can be briefly stated that the angularly inclined pan is arranged above the end wall 16 of the doghouse and delivers cullet glass received from a convenient source of supply (not shown) at a substantially constant rate onto the surface of a pool of molten glass 20. As the cullet glass moves forwardly in the upper area of the pool 20, the roll 19 is rotated to deposit a layer of the raw batch material thereupon. In conventional apparatus of this type, the roll or cylinder 19 is journaled in and driven by structural elements and means (not shown) located outwardly of the doghouse side walls 15 and is provided with circumferentially disposed compartments 21 extending longitudinally thereof into which the raw batch material mixture is delivered from the hopper 18. In this respect, a curved shield or plate 22 is located adjacent the roll 19 to retain the material in the compartments 21 until it can be deposited onto the stratum of cullet glass moving in the upper area of the molten glass 20. As viewed in FIG. 1, the ends of roll 19 are disposed inwardly of the side walls 15 to the end that the raw batch materials are laid down in a blanket-type layer B having a lesser width, as indicated by the broken lines 23 in FIG. 1, than the distance between the side walls 15 and a thickness substantially as indicated by the broken line 24 in FIG. 2.

Now, under optimum conditions of movement, the blanket B should move forwardly toward the actual melting zone of the furnace along a path generally defined by the broken lines 23 and without spreading outwardly toward the inner surfaces of the side walls 15. However, such optimum conditions of movement are rarely encountered in actual operation but instead discrete particles of the raw batch materials, or lumps thereof, break away from the edges of the layer and float on the surface of the molten glass pool 20 between the layer and the side walls 15. This unconfined tendency of the batch to spread or move laterally operates to carry such particles or lumps into contact with the side walls to which they adhere and gradually accumulate in size.

To control such undesired movement and spreading of the batch material from the marginal edges of the main body of the blanket or layer, there is provided in accordance with the present invention preferably adjacent each of the side walls 15 of the doghouse the novel apparatus, designated generally by the numeral 30, for moving the raw batch lumps inwardly from the vicinity of such walls and for compacting such lumps into the edges of the blanket. In this respect further, each device 30 is located, as shown in FIG. 1, adjacent and just forwardly of the ends of the roll 19.

Figure 3:
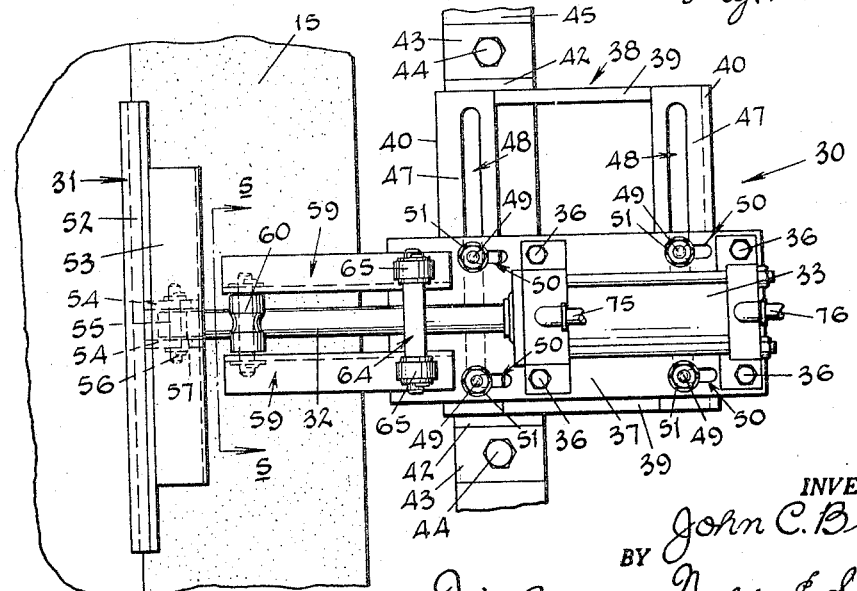
FIG. 3 is a plan view of the batch consolidating apparatus in accordance with the invention.
Figure 4:
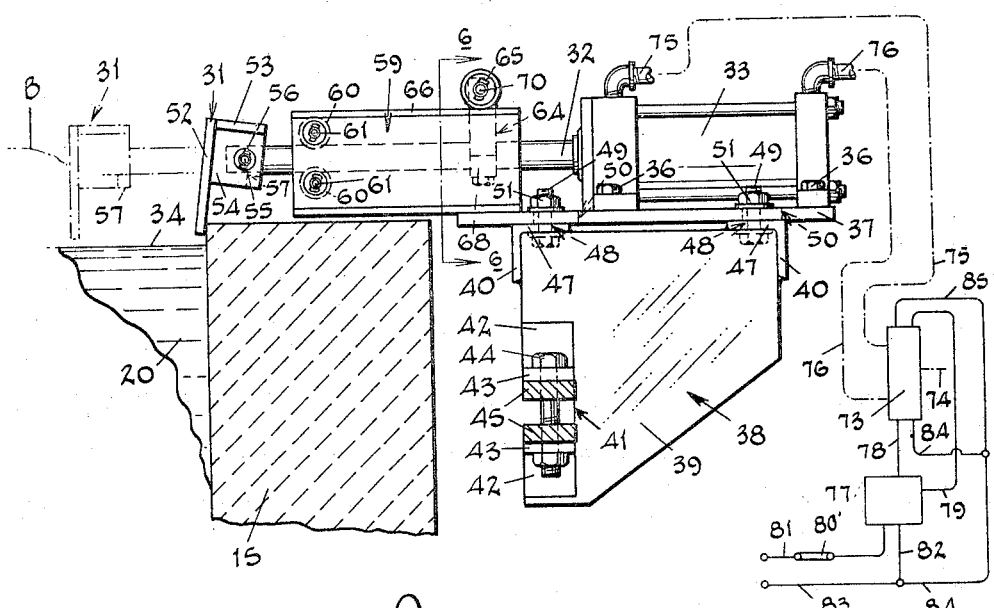
FIG. 4 is a side elevational view of the apparatus.

Referring now to FIGS. 3 and 4, it will be seen that each apparatus 30 includes a pusher blade 31 that is generally carried at the end of a piston rod 32 associated with a cylinder 33. As indicated by the full line position of the blade 31 in FIGS. 3 and 4 and the broken line position thereof of FIG. 4, the cylinder is adapted to move or skim the blade across and slightly above the level 34 of the molten glass pool 20 and in so doing push any batch lumps which have broken loose from the blanket B back into such blanket. More particularly, since each of the blades in the retracted (full line) position is disposed along and at the upper edges of the inner surface of the respective side walls 15, any batch lumps spreading out thereagainst will be compacted back into the blanket with the result that the wall surfaces will remain in substantially clean condition.

The cylinder 33 is attached by bolts 36 on a mounting plate 37 which in turn is supported on a frame 38 for both longitudinal and transverse adjustment. The frame 38 includes spaced, vertically disposed plates 39 to which are secured, as best shown in FIG. 4, angular braces 40 at the oppositely disposed upper corners. The plates 39 are notched as at 41 near their lower ends and L brackets 42 are fixed to the outer surfaces thereof with the horizontal disposed legs 43 of the brackets registering with the respective upper and lower edges of said notches. The legs 43 are formed with holes for receiving bolts 44 that are also passed through horizontally disposed bars 45 constituting bracing elements of the general furnace structure. The frame 38 is thus rigidly mounted relative to the adjacent side wall 15 but is also constructed so as to permit movement of the cylinder 33 in parallel relation to said wall as well as transversely thereof.

For this purpose, the braces 40 of the frame 38 are provided in their horizontally disposed leg portions 47 with elongated slots 48 to receive bolts 49 that are passed through registering openings 50 in the mounting plate 37. As viewed in FIG. 3, the openings 50 are formed as slots whereby upon loosening nuts 51 on bolts 49, the position of plate 37 can be adjusted along the associated frame 38 to suitably locate the pushing apparatus bodily with reference to the roll 19 and, when necessary, move the plate transversely to adjust its position relative to the wall 15.

The pusher blade 31 includes a substantially vertically disposed rectangular element or plate 52 which is reinforced along its upper margin by a rearwardly projecting flange 53. In the medial area of the plate 52, spaced, parallel extending lugs 54 are secured to the rear surface thereof and the bottom surface of the flange 53. The outer end of the piston rod 32 is freely pivotally connected to the pusher blade 31 by means of a short shaft 55 which extends through aligned openings or bores in the lugs 54 and the piston rod and is retained therein by cotter pins or the like 56. In order to restrain counterclockwise rotation of the blade, a bar 57 is welded to and extends between the lugs 54 at the lower rear corner thereof. In this manner then, the blade is held against counterclockwise rotation past the vertical when pushing and compacting any batch materials spreading laterally from the blanket B although it is free to rotate some distance clockwise during retraction in the event it comes into contact with any stray materials during this portion of its cycle, being limited in its rotation in this respect by contact of the flange 53 with the upper surface of the piston rod.

Since the blade 31 overhangs the side walls 15 in its projected position and thus could impose considerable torque on the piston rod 32, means are herein provided to support the rod for substantially free axial movement while simultaneously restraining any undesired rotational motion which would rotate the pusher blade in a vertical plane thereby resulting in objectionally immersing one end or the other of the blade in the molten glass and thus reducing its utility.

Figure 5:
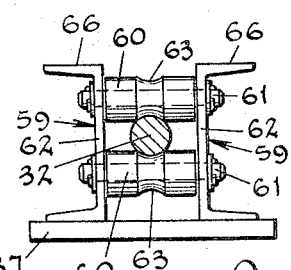
FIG. 5 is a transverse, vertical sectional view taken along the line 5—5 of FIG. 3.

For these purposes, the mounting plate 37 is equipped with spaced, fixed channels 59 which carry rollers 60 adjacent their outer ends. As viewed in FIG. 5, each roller 60 is freely rotatable on a shaft 61 that is supported in the vertically disposed webs 62 of the channels. The rollers are similarly formed to loosely engage the surface of the piston rod 32 and have arcuately shaped surfaces or grooves 63 approximating the cylindrical surface of the rod. This manner of support for the rod 32 permits free axial motion during projection or retraction of the pusher blade 31 by the cylinder 33. Additionally, a carriage 64 is attached or fixed to the rod 32 and includes casters 65 adapted to traverse the upper surfaces of legs 66 of the channels 59.

Figure 6:
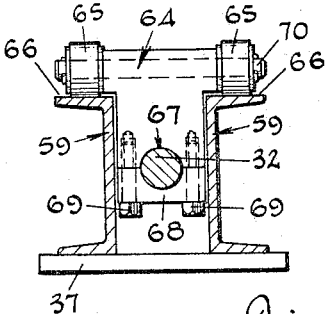
FIG. 6 is a transverse, vertical sectional view taken along the line 6—6 of FIG. 4.

The carriage, as seen in FIG. 6, is formed with a semicircular notch 67 in its lower surface to receive the rod 32 and is clamped thereto by a saddle-type block 68 and bolts 69. At its upper end, the carriage is cross-drilled to carry a shaft 70 at the opposite ends of which the casters 65 are journaled. The substantially rigid relation thus existing between the casters and the rod 32 insures that as the latter is propelled outwardly or inwardly by the cylinder 33, the casters will traverse the upper surfaces of the channel legs 66 and thus stabilize the pusher blade from tilting or rotating which would result in the dipping of one end or the other into the molten glass.

In FIG. 4, there is shown a schematic arrangement for producing periodic operation of the apparatus 30 whereby the pusher blades 31 will be intermittently projected inwardly from the side walls 15 of the doghouse to push and compact loose raw batch material particles or lumps into the body of the blanket or layer B. For purposes of illustration, this arrangement or control system includes a reversible valve 73 connected to a suitable source of power, such as compressed air or hydraulic fluid by a pipe 74, and to the forward and rear ends of cylinder 33 by pipes 75 and 76 respectively. The valve 73 is adapted to be activated to direct fluid selectively through either of pipes 75 or 76 by an electric timing device 77 through circuit lines 78 and 79. The timing device 77 is connected through a manual control switch 80 to a source line 81 and by a line 82 to a source line 83. During the inactive phase of each operating cycle, the device 77 completes a circuit through line 78 from the source line 81 to valve 73 and by line 84 to the source line 83. This causes the valve 73 to direct fluid through pipe 75 to the forward end of cylinder 33 thereby maintaining the piston rod 32 and pusher blade 31 in the retracted and full line position of FIG. 4.

The timed interval monitored by the device 77 may be adjusted to cause forward motion of the blade 31 when the batch material on the surface of the molten glass has been carried a distance which is substantially equal to or slightly less than the length of the blade. Thus, upon completion of a timed interval, the device 77 becomes operable to open line 78 and close line 79 to complete a circuit from sources 81 and 83 through lines 79 and 85 to valve 73. The direction or flow of fluid through pipe 76 to the rear end of cylinder 33 now activates the latter to propel the piston rod 32 outwardly thereby projecting the pusher blade from the vicinity of the side wall 15 to the position indicated in broken line in FIG. 4. During such movement of the blade, any freely floating lumps of batch material present on the surface of the molten glass will be contacted by the blade, pushed away from the doghouse side wall surfaces and compacted into the marginal edge 23 of the batch blanket or layer B. In other words, any portions of the batch loosening and falling away from the batch layer B may thus be carried divergently as indicated by lines 90 in FIG. 1. However, during projection of the pusher blade, such material portions will be urged and compacted into the layer within the lines 23 defining the general desired width of the raw batch layer.

It is to be noted that during the projecting and retracting movements of the pusher blades, the lower edges thereof are preferably carried slightly above the surface of the molten glass as indicated by the line 34 to prevent adherence of glass to the relatively cooler blades which, of course, would be objectionable since the adhered glass would inevitably gather and hold the raw batch materials thereby defeating the purpose and utility of the blades.

At the limit of projected movement of the blade, the timing device 77 opens the circuit through line 79 and recloses the circuit through line 78 thereby reversing the direction of fluid and causing same to again flow to the forward end of the cylinder 33 through pipe 75. The piston rod 32 of cylinder 33 is thereby operated to retract the pusher blade. Preferably, although not essentially, the cylinders of the apparatus 30 arranged at the opposite side walls 15 of the doghouse are equipped with duplicate control systems that are synchronized to produce substantially simultaneous operation of the associated pusher blades to the end that the width of the batch blanket or layer will be maintained and loosened lumps at either side will be more or less simultaneously periodically returned thereto. Likewise, one timing device 77 may be used to control both systems to assure concurrent projecting and retracting movement of the blades if this be found desirable.

Figure 7:
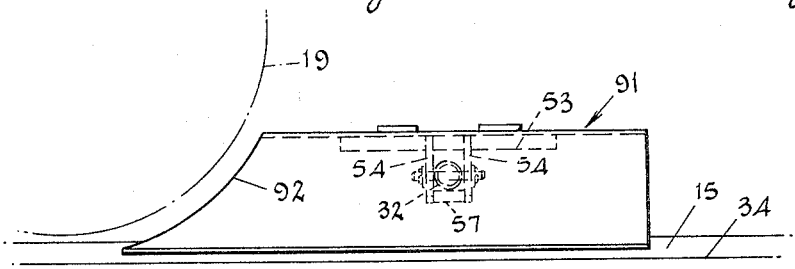
FIG. 7 is an elevational view of a modified form of apparatus in accordance with the invention.

A modified form or embodiment of a pusher blade in accordance with the invention is shown in FIG. 7 and indicated generally at 91. As illustrated therein, the blade 91, instead of having the rectangular form or outline of the blade 31, is provided with an arcuate side edge 92. This particular shaped edge is found to be of advantage in the event that the compacting or pushing apparatus is to be located in close proximity to the end plates of the roll 19. Thus, by so positioning the apparatus and with the edges 92 of the blades 91 adjacent the end plates, the blades will act upon the marginal edges of the blanket layer B substantially as the cullet and raw batch materials are deposited on the surface of the molten glass pool. This will operate to compact the material along the marginal edges before loosening or falling of batch lumps becomes existent and thus a problem.

Briefly summarizing the novel aspects of the present invention, it has been found that during the delivery of glass making materials onto the surface of molten glass at the charging end or doghouse of a glass-melting tank-furnace, the material particles forming the marginal edge portions of the so-formed blanket or layer on the molten glass surface occasionally have a tendency to fall from the body of the layer and move divergently toward the doghouse side walls in lumps of one size or another. Unless properly controlled, this acts to create objectionable accumulations on the inner wall surfaces which gradually increase in size until the continuity of the blanket edges is destroyed. As aforementioned, this condition is materially reduced if not completely eliminated by employing the novel method and apparatus of this invention whereby the pusher blades 31 or 91 are periodically or intermittently operated to skim the glass surface inwardly of the side walls to return free floating batch lumps into the body of the layer thereby assuring the maintenance of a clean condition along the dog-house side walls and substantially unrestricted flow of the glass making material to the melting zone of the furnace.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

I claim:

1. In a method of delivering glass making materials to the charging zone of a tank-furnace, wherein said materials are fed onto the surface of a molten glass bath in said charging zone in a blanket-like layer having a predetermined width less than the distance between the side walls of the furnace defining said charging zone and thereafter advanced in said blanket-like layer toward and into the melting area of the furnace, the improvement comprising the step of intermittently pushing and compacting from the said side walls inwardly any free floating lumps of material which have broken loose from said layer back into the marginal edges of the layer to thus maintain said side walls free of accumulations of said glass making materials and substantially preserve said predetermined width of said layer during passage of said materials into said melting area.

2. A method of delivering glass making materials to the charging zone of a tank-furnace as claimed in claim 1, wherein said intermittent pushing and compacting of the free floating lumps back into the marginal edges of the layer is in timed relation to the movement of the glass making materials from their point of discharge through the charging zone of the furnace.

3. In apparatus for delivering a layer of glass making materials onto the surface of a bath of molten glass in the charging area of a tank furnace and advancing said materials forwardly from the charging area into the melting zone of the furnace, said charging area being in open communication with said melting zone and including an end wall and oppositely disposed side walls, means for depositing said glass making materials upon the molten glass in said charging area in a continuous layer with the edges of said layer spaced slightly inwardly from said side walls, a pusher blade mounted adjacent each said side wall between said side wall and the adjacent edge of said layer, the lower edge of each said pusher blade being disposed slightly above the surface of the molten glass, and means for periodically moving each said pusher blade inwardly from said side wall toward said adjacent edge of said layer to push batch material which has broken loose from said layer back into the marginal edge thereof and maintain said marginal edges spaced inwardly from said side walls.

4. Apparatus for delivering a layer of glass making materials onto the surface of molten glass as claimed in claim 3, wherein said pusher blades extend longitudinally substantially parallel to said side walls, and said means for periodically moving said pusher blades inwardly includes control means operable to move said blades inwardly in timed relation to the advancement of said continuous layer at intervals of said advancement not greater than the length of said pusher blades.

5. Apparatus for delivering a layer of glass making materials onto the surface of molten glass as claimed in claim 3, wherein said means for periodically moving each said pusher blade includes a fluid actuated cylinder and piston rod, said pusher blade being pivotally mounted on said piston rod so as to be restrained in a substantially vertical plane during said inward movement and free to pivot out of the vertical plane on the return movement.

References Cited by the Examiner

UNITED STATES PATENTS 1,953,427 4/1934 Moorshead _____ 65—27
3,193,119 7/1965 Blaine _____ 65—335

FOREIGN PATENTS 835,203 5/1960 Great Britain.

DONALL H. SYLVESTER, *Primary Examiner.*

G. R. MYERS, *Assistant Examiner.*